United States Patent
O'Neill

(10) Patent No.: US 7,647,408 B2
(45) Date of Patent: Jan. 12, 2010

(54) METHODS FOR ENHANCING SDP PRECONDITIONS SIGNALLING FOR IP MULTIMEDIA SESSIONS

(75) Inventor: Alan O'Neill, Henley Beach (AU)

(73) Assignee: Qualcomm Incorporated, San Diego, CA (US)

( * ) Notice: Subject to any disclaimer, the term of this patent is extended or adjusted under 35 U.S.C. 154(b) by 588 days.

(21) Appl. No.: 10/356,146

(22) Filed: Jan. 31, 2003

(65) Prior Publication Data

US 2003/0149775 A1 Aug. 7, 2003

Related U.S. Application Data

(60) Provisional application No. 60/353,547, filed on Feb. 1, 2002.

(51) Int. Cl.
*G06F 15/16* (2006.01)
(52) U.S. Cl. ............... 709/227; 709/228; 709/231; 370/277; 370/379
(58) Field of Classification Search ......... 709/227–228, 709/231; 370/277, 379
See application file for complete search history.

(56) References Cited

U.S. PATENT DOCUMENTS

| | | | |
|---|---|---|---|
| 6,788,676 B2 * | 9/2004 | Partanen et al. ............ | 370/352 |
| 6,798,757 B2 * | 9/2004 | Mizutani et al. ............ | 370/329 |
| 7,103,067 B1 * | 9/2006 | Singh et al. ................ | 370/467 |
| 2002/0165966 A1 * | 11/2002 | Widegren et al. .......... | 709/226 |

OTHER PUBLICATIONS

Marshall, W., et al., Integration of Resource Management and SIP, IETF Internet Draft, draft-ietf-sip-manyfolks-resource-02.txt, Aug. 2001, pp. 1-28.
Camarillo, P., et al., Integration of Resource Management and SIP, IETF Internet Draft, draft-ietf-sip-manyfolks-resource-04.ps, Feb. 25, 2002 pp. 1-18.
Bos, L., et al., A Framework for End-to-End Perceived Quality of Service Negotiation, IETF Internet Draft, draft-bos-mmusic-sdpqos-framework-00.txt, Nov. 2001, pp. 1-22.
Papalilo, D., et al., Extending SIP for QoS Support www.coritel.it/publications/IP_download/papalilo-salsano-veltri.pdf, Dec. 8, 2001, pp. 1-6.

* cited by examiner

*Primary Examiner*—Nathan J Flynn
*Assistant Examiner*—Mohammad A Siddiqi
(74) *Attorney, Agent, or Firm*—Michael P. Straub; Kam T Tam

(57) ABSTRACT

This application describes how Session Description Protocol (SDP) preconditions signaling can be enhanced to support lead role negotiation, precondition capability exchange, premature precondition attempts and concatenated preconditions processing. The application describes the use of send and receive tags in an SDP message for a given media line. In a given message, a success or failure tag may be associated with a send or receive tag in addition to an optional or mandatory condition indicator tag. A lead role indicator may also be associated with a send or receive tag to indicate a desired preference with regard to the sender or receiver taking the lead role. These additions lead to a greater chance of successful session set-up completion, reduce the number of signaling exchanges in general, and enable precondition attempts to be started earlier and to be executed in parallel.

38 Claims, 13 Drawing Sheets

| Invite | 18X | Exec Order | COMET -AB | COMET -BA | Comments |
|---|---|---|---|---|---|
| 1 send | recv F c | A(-B) | YES | No | B cant do it and A happy. |
| 7 send F (c) | recv | B | No | (c) | B happy to do it and A re-affirms this. Optional COMET to A |

| Invite | 18X | Exec Order | COMET-AB | COMET-BA | Comments |
|---|---|---|---|---|---|
| Send W | recv W c | A-B | Yes | No | A starts. B says it is capable |
| Send W | recv F c | A-B | Yes | No | A starts. B says it is incapable |
| send c | recv c | A-B | Yes | No | B prefers A to do it. |
| send c | recv W | B-A-B | No | Yes | B doing it |

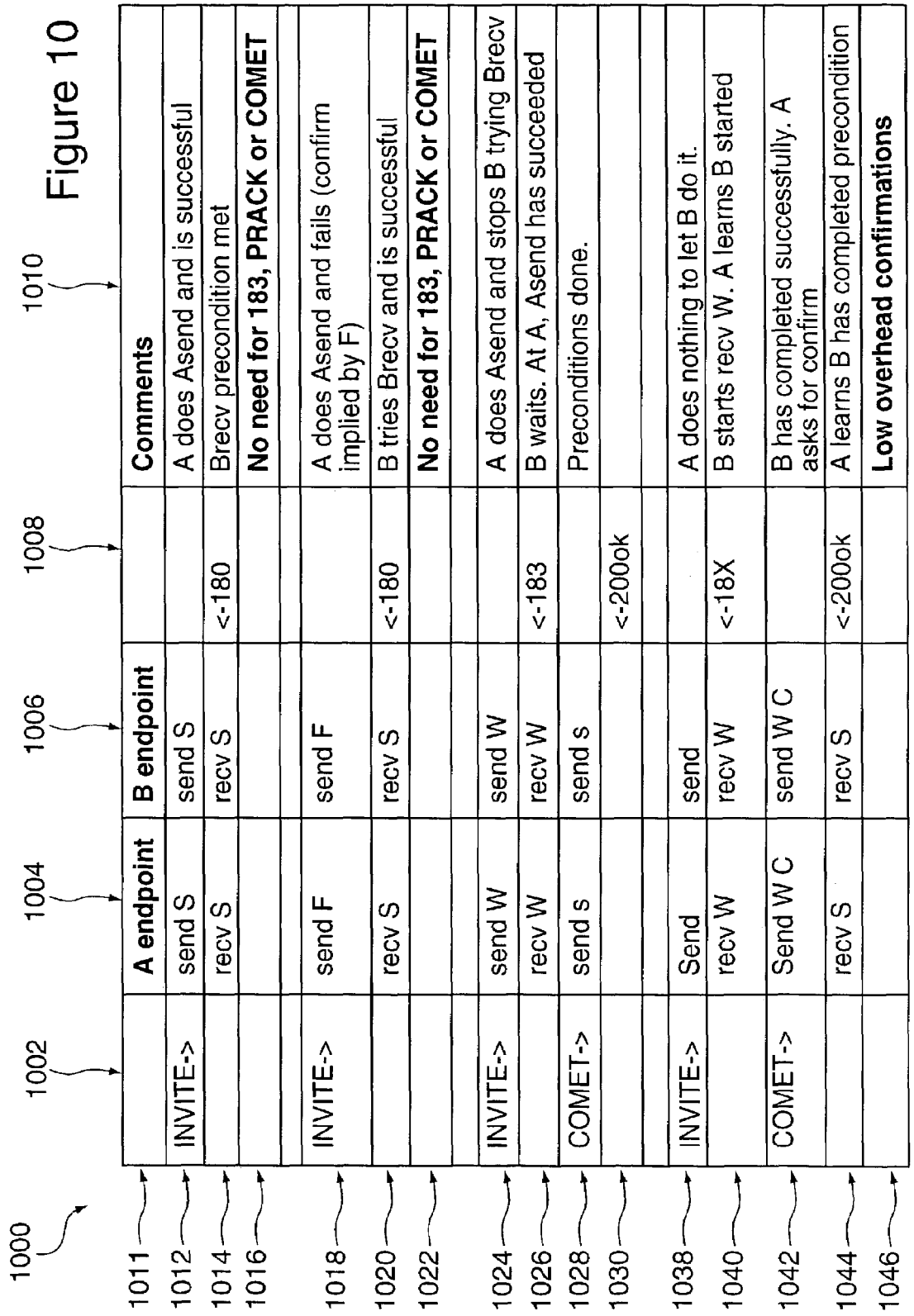

Figure 10

| | A endpoint | B endpoint | | Comments |
|---|---|---|---|---|
| 1011 | | | 1004 / 1006 / 1008 / 1010 | |
| 1012 INVITE-> | send S | send S | | A does Asend and is successful |
| 1014 | recv S | recv S | <-180 | Brecv precondition met |
| 1016 | | | | No need for 183, PRACK or COMET |
| 1018 INVITE-> | send F | send F | | A does Asend and fails (confirm implied by F) |
| 1020 | recv S | recv S | <-180 | B tries Brecv and is successful |
| 1022 | | | | No need for 183, PRACK or COMET |
| 1024 INVITE-> | send W | send W | | A does Asend and stops B trying Brecv |
| 1026 | recv W | recv W | <-183 | B waits. At A, Asend has succeeded |
| 1028 COMET-> | send s | send s | | Preconditions done. |
| 1030 | | | <-200ok | |
| 1038 INVITE-> | Send | send | | A does nothing to let B do it. |
| 1040 | recv W | recv W | <-18X | B starts recv W. A learns B started |
| 1042 COMET-> | Send W C | send W C | | B has completed successfully. A asks for confirm |
| 1044 | recv S | recv S | <-200ok | A learns B has completed precondition |
| 1046 | | | | Low overhead confirmations |

| | 1102 | 1104 | 1106 | 1108 | 1110 | 1112 | 1114 |
|---|---|---|---|---|---|---|---|
| 1116 | INVITE-> | Send Y | send Y | send Y | send Y | | A starts progress-tag checks with Y and all ok |
| 1118 | | recv S Y | recv S Y | recv S Y | recv S Y | <-180 | S indicates that precondition has been met |
| 1120 | INVITE-> | Send Y | send Y | send N | send N | | NO admission into at least one trunk |
| 1122 | | recv F N | recv F N | recv F N | recv F N | <-18X | Failed result-tag returned. Checked again but bad |
| 1124 | INVITE-> | Send Y | send Y | send Y | send N | | NO admission into a least one trunk |
| 1126 | | recv F Y | recv F Y | recv F Y | recv F Y | <-18X | failed result-tag returned. Progress-tag now Ok |
| 1128 | COMET-> | send S Y | | | | | |
| 1130 | INVITE-> | Send Y | send Y | send M | send M | | one node gave Maybe progress |
| 1132 | | recv W Y | recv W Y | recv W Y | recv W Y | <-18X | Wait result-tag returned and ok on rechecking |
| 1134 | COMET-> | send S Y | | | | | |
| 1136 | INVITE-> | Send Y | send Y | send M | send F N | | one node gave Maybe progress followed by a failure |
| 1138 | | recv F N | recv F N | recv F N | recv F N | <-18X | Failure result-tag returned but still fails |

Figure 11

METHODS FOR ENHANCING SDP PRECONDITIONS SIGNALLING FOR IP MULTIMEDIA SESSIONS

RELATED APPLICATIONS

The present application claims the benefit of U.S. Provisional Patent Application Ser. No. 60/353,547, filed Feb. 1, 2002, which has the same title as the present application and which is hereby expressly incorporated by reference.

BACKGROUND

Many applications require a minimum amount of resource to be useful. One example is traditional voice telephony that below either a target minimum bandwidth or above a maximum delay becomes unusable. During call set-up in traditional fixed telecom networks (e.g., the PSTN), a signaling channel first checks that sufficient resources exist between the caller and callee before admitting the call and ringing the callee in the case of voice. If there is insufficient resource then the call is refused with a network busy signal. The resource availability is a precondition for the session to be set-up. This model has continued into the Internet world to ensure that Voice over IP applications can offer an equivalent user-experience to the PSTN, and so that VoIP can successfully interwork with the PSTN. However, many IP multimedia sessions would not require such a strict model.

A SIP Working Group Internet Draft Document: <draft-ietf-sip-manyfolks-resource-02> dated August 2001, hereinafter "the Draft" describes known art on the support of preconditions in the Internet signaling plane. The Draft may be obtained from the Internet Engineering Task Force (IETF) which can be contacted at www.ietf.org. This patent application is to be read and understood in the context of this existing Draft. The Draft describes how the Session Initiation Protocol (SIP) (session set-up signaling) can be used to carry the Session Description Protocol (SDP) (description of the session to be set-up) between Internet endpoints. The Draft specifically describes SDP preconditions whereby both SIP and SDP are extended to enable the two ends to negotiate and agree on the preconditions for the session. In addition, the signaling also establishes the order in which the two ends will attempt to meet those preconditions. The preconditions are direction specific in that they apply to the two endpoints A (the caller) and B (the callee) in the form of a precondition for resources and/or security from A to B, from B to A or for both directions. The preconditions attempt order can be B only, A then B or B then A then B (for example). The attempt order is determined through the exchange of confirm requests during the SDP exchanges. The results of each attempt on a precondition are then communicated to the other endpoint in a new SIP message defined in the Draft named the COMET (confirmation). An example of a typical SIP signaling flow is shown in FIG. 1.

The major problems with the existing model are as follows;
i) They have been designed specifically with the heavyweight VoIP requirement which leads to a large amount of signaling messages even for the simplest of preconditioned sessions.
ii) The capabilities of the endpoints for meeting offered preconditions are not fully exchanged so it is possible that excess signaling and set-up delay can be generated chasing unavailable options.
iii) The lead roles for the endpoints in meeting preconditions (first attempts) is not always agreed and so first attempts cannot necessarily execute in parallel. Parallel execution would reduce set-up times and would only be extended if the lead endpoint failed to meet a precondition due to probabilistic events (in which case the next endpoint would retry following a COMET). In addition, many lead role options are not available due to them not being fully negotiable as a result of the signaling design.
iv) Preconditions cannot generally start to be attempted until the pre-ring (pre-SIP 180 response) signaling has completed. This is a VoIP requirement (phone doesn't ring until resources are in place) but not typical across all IP applications and sessions. This enforces all sessions to incur the cost of multiple signaling messages and associated signaling delay even when both ends already have all preconditions in place (preconfigured resources or security associations).
v) Preconditions are negotiated only by endpoints and the Draft makes arguments as to why this is reasonable. However, the arguments are specific to the CableLabs DOCSIS DqoS architecture which provides QoS (Quality of Service) and security signaling between the hosts end to end to enable them alone to meet the preconditions. However, end to end QoS signaling is expensive and slow and not necessary in a large number of deployment scenarios. A more general model for preconditions signaling is therefore required.

SUMMARY OF THE INVENTION

The present invention is directed to methods and apparatus establishing communications sessions and, more particularly, to enhanced methods of performing session description protocol signaling. Various methods for enhancing Session Description Protocol (SDP) precondition signaling to support lead role negotiation, precondition capability exchange, premature precondition attempts and concatenated preconditions processing are described.

In accordance with one feature of the present invention, rather than allow only a single send, recv or send/recv tag per media line, in accordance with the present invention both a send tag and recv tag may be included in a SDP message for a given media line. This allows additional tags indicating additional information to be different for the send and receive directions, e.g., in a single SDP message tags associated with a send tag may be different than tags associated with a recv tag for a given media line. When the tags corresponding to the send and receive directions are the same for a given media line, the send/recv tag may be used instead of separate send and recv tags. The use of separate send and receive tags in a single message allows a session to be set up with different preconditions in each direction using far fewer messages than is possible using messages which are limited to a send, receive, or send/recv tag per media line. This feature of the invention is particularly useful in setting up multimedia sessions where session preconditions frequently differ depending on the direction of communication.

Another technique used to reduce the number of messages required to establish a communications session includes the use of a success or failure tag in addition to a mandatory or optional tag corresponding to the same media line, in a single message. This allows a network element to signal in an invite message that it has already satisfied, or is unable to satisfy, a precondition while, at the same time, indicating if the precondition is a mandatory or optional precondition. In cases where an initiating node has already been successful in meeting a precondition, this signaling can reduce session establishment time since the node receiving the invite message will immediately know that the precondition has been satisfied and that it need not try and satisfy the precondition or wait for the imitating node to satisfy the condition.

One problem with existing SDP signaling is that it is not possible to convey lead role information in the initial invite message. As a result of the uncertainty with regard to which end device is responsible for taking the lead role in satisfying session preconditions, unnecessary delays and/or additional messages may result. In accordance with one feature of the present invention, a lead role indicator is included in an SDP message. The lead role indicator indicates the message sender's preference as to whether the message sender or receiver should take the lead role. The receiving device may accept the senders lead role preference or indicate that it desires something different with regard to lead roles through the use of lead role indicators in a reply message. When combined with the failure tag, the lead role indicator can convey the message sender's inability to satisfy a precondition and desire for the receiving node to handle the task of satisfying the precondition.

In order to avoid duplication of efforts at satisfying preconditions and to avoid potentially unnecessary messages, the present invention supports a tag value of "wait" in addition to success or failure. The wait indicator may be associated with a send, recv, or send/recv tag in a precondition message instead of the success or failure value. The wait indicator indicates to the receiving node that it should wait for an additional message before attempting to satisfy the precondition associated with wait indicator, e.g., because the sender of the message with the "wait" indicator is in the process of trying to satisfy the precondition. The use of the "wait" indicator can be particularly beneficial in the context of forking proxies which transmit a received SDP message to multiple nodes. The use of the "wait" indicator prevents the multiple nodes receiving the SDP message from each attempting to satisfy a precondition associated with the "wait" indicator which can happen when a wait indicator is not used. Thus, the use of a wait indicator can reduce the number of possibly unnecessary attempts by devices receiving an SDP message to satisfy a precondition. Reducing the number of attempts to try to satisfy a precondition, means that the number of messages transmitted is generally reduced, leading to more efficient use of communications bandwidth.

Communications paths between SDP signaling end nodes may include multiple hops, where each hop normally corresponds to a link between network elements. A link may correspond to a tunnel between two network elements in which case the link may include connections between multiple nodes. SDP signaling preconditions may be satisfied on one link of a communications path but not another. In accordance with one feature of the present invention, an end node determines from information included in an SDP message whether a session precondition has been satisfied end to end based on information indicating whether multiple links have each satisfied the precondition. In such an embodiment, a determination of success or failure with regard to a path including multiple links is determined based on the success or failure in satisfying the precondition on each of the multiple links. To facilitate such a determination, the present invention supports use of a tag in an SDP message which is used to indicate success or failure in satisfying a precondition on a portion of a communications path between SDP signaling end points. This particular tag is modified, in accordance with the present invention, by a network node between the SDP signaling end nodes to indicate success or failure with regard to satisfying preconditions with regard to a portion of the communications paths between SDP signaling end points.

As part of the SDP signaling and transmission process, SDP signals are generated in accordance with the present invention and transmitted between end nodes, e.g., network elements which serve as SDP signaling endpoints. The generated and transmitted messages are often stored in the network nodes as part of the SDP signal generation and transmission process. The messages may, and in various embodiments are, stored in buffers and/or memory comprising digital storage media, e.g., a machine readable medium. Thus, in addition to being directed to the generation and transmission of messages, the present invention is directed to machine readable medium, which include one or more SDP messages of the type described herein. Such storage devices are normally part of network nodes such as servers, and/or other network elements which serve as SDP message endpoints and/or SDP message transmission and/or processing elements. A network element which generates, receives, transmits or otherwise manipulates or processes an SDP message is generally referred to herein as an SDP Preconditions Processor (SPP). Network elements may be implemented using servers which, as is known in the art, typically include one or more CPUs, memory an input interface and an output interface. Messages are received by the input interface and transmitted by the output interface. Messages are subject to storage and/or processing which may be performed under the control of the CPU included in a network node, e.g., server.

To facilitate a through understanding of the invention, numerous examples of transmitting SDP signals between network elements corresponding to SDP end points, e.g., network elements A and B, are included in the tables provided in various figures and in the detailed description which follows.

Numerous additional features and benefits of the present invention will be apparent in view of the Figures and detailed description which follows.

BRIEF DESCRIPTION OF THE DRAWINGS

FIGS. 10-13 and the tables included therein show additional examples relating to different signaling features of the present invention.

DESCRIPTION OF THE INVENTION

The methods and apparatus of the present invention are directed to a number of procedures to enable the IP signaling layer (SIP/SDP or similar mechanisms) to perform a richer preconditions negotiation leading to faster, more efficient and more generally applicable session preconditions.

Figure 1:
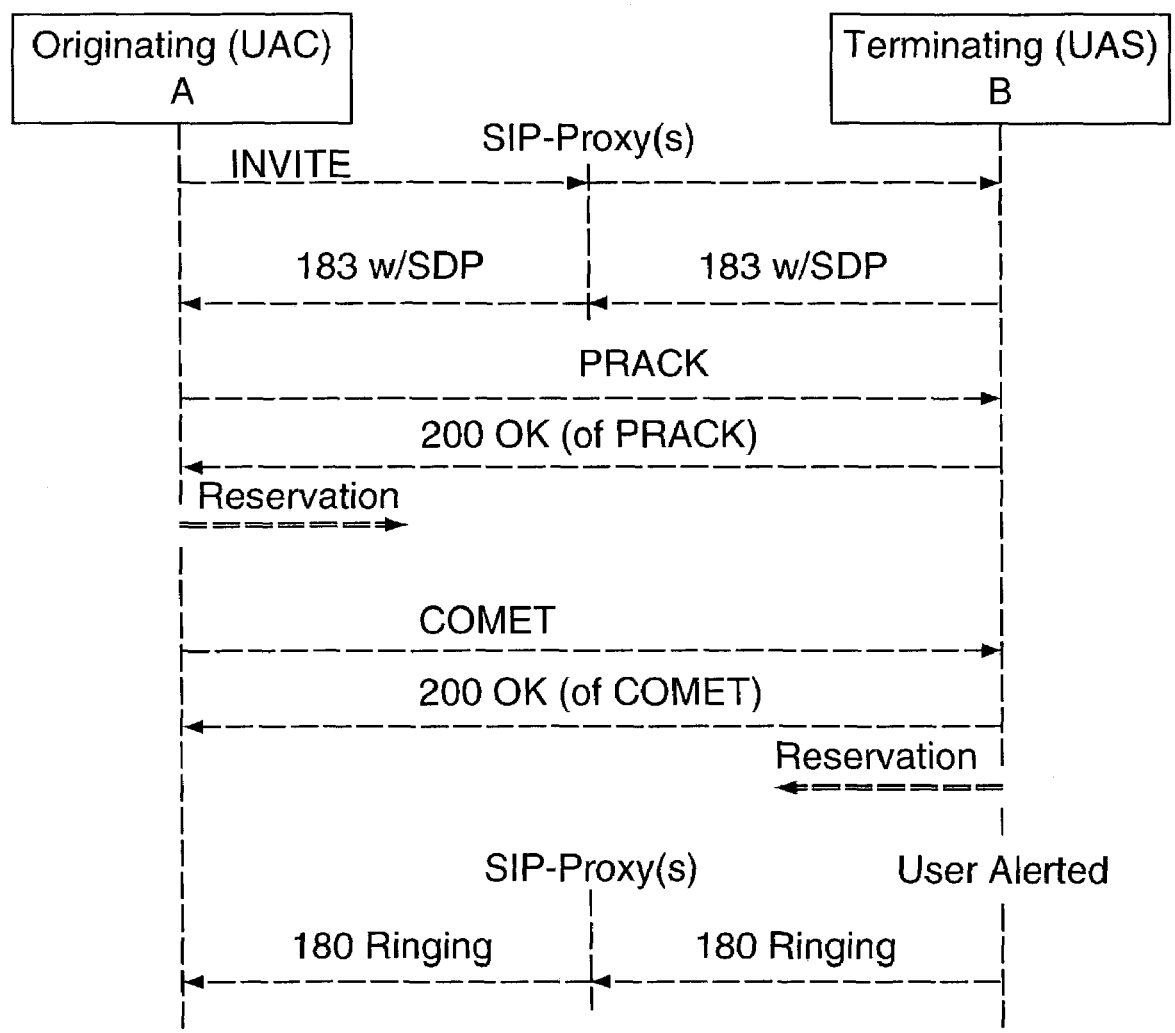
FIG. 1 illustrates an exemplary known call flow from the prior art Draft.
Figure 2:
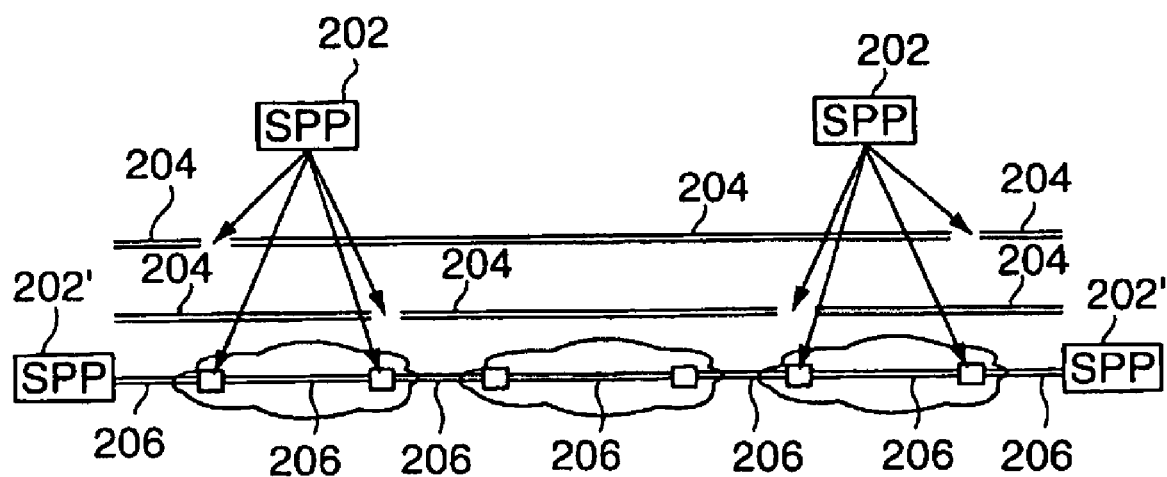
FIG. 2 illustrates SDP Preconditions Processor (SPP) based admission control procedures implemented in accordance with one feature of the invention.

FIG. 2 shows a simplified exemplary system 200 which will be used to explain SDP Precondition Processor (SPP) based Admission Control with respect to various features of the present invention. The system 200 implemented in accordance with the invention includes an arbitrary number of SPPs 202 between, and including, at least two SPP end-points 202'. Each SPP 202 manages at least one virtual QoS trunk 204 for preconditions purposes. A virtual trunk 204 is a concatenation of links or physical trunks 206 over which there is a known resource allocated and into which session admission is generally undertaken by a single authoritative SPP 202 as shown in FIG. 2. This is so that the SPP 202 is aware of all active sessions on the trunk 204 and can compare this and new precondition requests against the allocated trunk resources for that session type. An SPP 202 can rely on configured data, dynamic loading data or triggered results from reservation protocols to know the capacity of a trunk 204. An SPP 202 can be in the data path and undertake ingress or egress preconditions admission control into a virtual trunk 204.

An SSP 202 can be remote from the data-path and be configured or updated with the trunk capacity of that trunk 204 directly or indirectly by its constituent elements. A remote SPP 202 can undertake ingress or egress admission control for the trunk 204. A remote SPP 202 that must logically admit at both ends of a virtual trunk 204 is undertaking mutual preconditions admission control.

In the special case of a virtual trunk 204 with an SPP 202, for example 202', at either end, each SPP 202 may only be responsible for preconditions checks at one end of the trunk 204 or only for a specific precondition direction-tag. In this case, the two SPPs 202 need to know about this situation so that only one of them attempts to meet each precondition for that virtual trunk 204, and the other one does not interfere with the specific progress of meeting that precondition attempt of the first SPP. In addition, two SPPs 202 on such a virtual trunk 204 may alternatively need to both check the precondition on that trunk 204 in which case both should update the progress-information associated with the precondition. Finally, an SPP 202 may be responsible for a virtual trunk 204 involving a concatenation of multiple QoS mechanisms on links 206 within that virtual trunk 204. This may require the SPP 202 to invoke multiple parallel and serial checks and signaling protocols to produce a local progress indication from that SPP as to the progress in meeting the precondition. The mapping between SPPs 202, virtual trunks 204 and physical router, links 206 and QoS capabilities is the subject of future enhancements but simple examples are included below.

In FIG. 2, the requester, for example end SPP 202', may set preconditions for a call. Each of the SPPs 202, 202' represents a network element corresponding to a point of admission control for the call request where the admission control requirement is defined by the precondition in an SDP message. Each SPP 202, 202' during a call set-up attempt compares the requested SDP preconditions against trunk load(s) and/or other resource information for their links to determine if the preconditions can be satisfied. The trunks may be real, aggregated and/or virtual. As part of the signaling, admission control failures associated with preconditions are passed end to end.

Table A below illustrates one possible Execution Order of precondition attempts by two ends, e.g., two network elements 202'a, 202'b, (update figure) operating as SDP signaling end points. Capabilities column indicates what each end is capable of in attempting to meet the agreed preconditions. Execution order is then somewhat dictated by the confirm information between endpoints which triggers the COMET messages to order the various completion attempts. Note that in each of the scenarios illustrated below B always is the last to try as it is this node that should be sure the preconditions are met before ringing the callee.

Table A

| Capabilities | Execution Order | Confirms (hence COMETs) |
|---|---|---|
| A needs B | B then A then B | A wants COMET-BA. B must ask for COMET-AB. |
| B needs A | A then B | B asks for COMET-AB. |
| B can do all | B | Neither asks for COMETs |

The COMET from A to B (COMET-AB)(confirm sent from B) is used if A tries to meet some of the precondition(s) before B, so that B knows what is left to do.

The COMET from B to A (COMET-BA) (confirm from A) is used if B tries to meet some of the precondition(s) before A, then A finishes the job. A then tells B the result using the COMET-AB (confirm from B).

A request for a COMET is an indication from one endpoint that it needs help from the other endpoint to meet the preconditions. In accordance with one feature of the invention a request for a COMET is used as a lead role indicator as will be discussed below.

In the known Draft, a single direction tag may be used per media line in an SDP message. In accordance with the Draft, the direction tag can be send or recv or sendrecv. In an SDP message generated in accordance with the known draft, separate send, recv tags may not associated with the same media line. The intent of a send tag, recv tag, and a send/recv tag is to indicate the direction in which resources need to be reserved from the viewpoint of the creator of the SDP message. In the known draft an optional strength tag can be associated in the SDP message with a direction tag. The strength tag in the known Draft can assume one of four values (mandatory, optional, success, failure). Normally the mandatory or optional values might be used in an initial SDP message with the success or failure value being used in a subsequent, e.g., reply SDP message. The signaling described in the Draft does not support the possibility of a mandatory or optional indication being associated with a direction tag at the same time that a success or failure indicator is associated with a direction tag. The use of a combined sendrecv direction tag with a single strength tag does not cover, and precludes, the case where the strength tag is different for send and recv directions for a media line in a given SDP message, as might be common in non VoIP applications.

The inventor of the present application realized that it would be more advantageous to have separate lines for send and recv directions in the same SDP body for a given media line and limit the sendrecv value to those cases where all associated tags are the same for both direction tags corresponding to a single media line in a single SDP body.

For the SDP example in section 5.1 of the known Draft, the sendrecv direction-tags when replaced with separate send and receive direction tags in accordance with the invention, results in the following SDP message.

v=0
o=mhandley 2890844526 2890842807 IN IP4 126.16.64.4
s=SDP Seminar
i=A Seminar on the session description protocol
u=http://www.cs.ucl.ac.uk/staff/M.Handley/sdp.03.ps
e=mjh@isi.edu (Mark Handley)
c=IN IP4 224.2.17.12/127
t=2873397496 2873404696
m=audio 49170 RTP/AVP 0
a=qos:mandatory recv confirm m=video 51372 RTP/AVP 31
a=secure:mandatory send
a=secure:mandatory recv temporarily
m=application 32416 udp wb
a=orient:portrait
a=qos:optional send
a=qos:optional recv Note that in the above example, separate send and receive direction tags are included in the SDP message body on a per media line ("m=") basis. For example, for media line "m=video 51372 RTP/AVB 31" separate direction tags are included in lines "a=secure:mandatory send" and "a=secure:mandatory recv". In addition, separate send and receive direction tags are included in accordance with the invention for media line "m=application 32416 udp wb". If the preconditions for the send and receive directions for a given media line are the same, the known sendrecv direction tag could be used for the media line instead of separate send and receive direction tags.

The separation of send and receive direction tags for a media line enables COMET (confirmation) messaging for each direction to be decoupled whereby a UAC/UAS can signal an inability to attempt/provide one direction of security or QoS in advance of the completion of the other direction-tag that it is able to attempt. This enables the peer to either quickly start and attempt to meet that precondition itself, or failing that to quickly CANCEL the call or other application for which the session is being established. In addition, this separation enables the sender to request a confirmation for only one of the directions, and in fact to be specific about which direction-tag it seeks a confirmation on. This split direction-tag can be used in conjunction with the Lead Role Negotiation feature of the present invention which are discussed next.

In the Draft, Send, recv and Sendrecv are ambiguous with regard to which of the endpoints, A and B, is to take a lead role because A says what it wants but does not say what it can do and what it expects from B. This can lead to many more messages than would be necessary if lead role information could easily be conveyed in an SDP message.

The problem with the known Draft, is that the preconditions negotiation does not assign lead roles. By assigning the lead roles in accordance with the invention it is often possible to rapidly start preconditions without waiting for the COMETs. COMETs may still be necessary to cause the other end to try to meet the precondition if the lead end fails in meeting that precondition.

One way to achieve the identification of the lead roles, in accordance with the invention, is to use separate precondition lines for each direction-tag, and then intelligently use the confirmation tag as a lead role indicator. Examples of using the confirm tag as a lead role indicator are shown in Tables 400, 500, 600,700 of FIGS. 4-7. Essentially, the confirm tells the peer that the sender wishes the peer to become the lead role for that precondition and hence wishes a confirmation of the result. Thus, in the setup message it serves as a lead role indicator. The confirm does not however signal that the sender endpoint is incapable of meeting the precondition. This is all in sharp contrast to the confirm used as in the existing known Draft, which signals only that the sender needs help in meeting the precondition. The receiving endpoint can use the strength tag in a later Confirm message to indicate its success or failure for meeting preconditions.

The logic is shown in the tables 400,500,600,700 of FIGS. 4-7.

The following general notes apply when interpreting tables 400, 500, 600, 700 FIGS. 4-7:

(1) Missing result tag means the endpoint is capable of attempting to meet the precondition.
(2) Wait says continue with the negotiation as if this precondition didn't exist, but do not establish the session
(3) F says continue with the negotiation but realize I am not capable.
(4) S says stop the negotiation because it was successfully completed, e.g.

Figure 4:
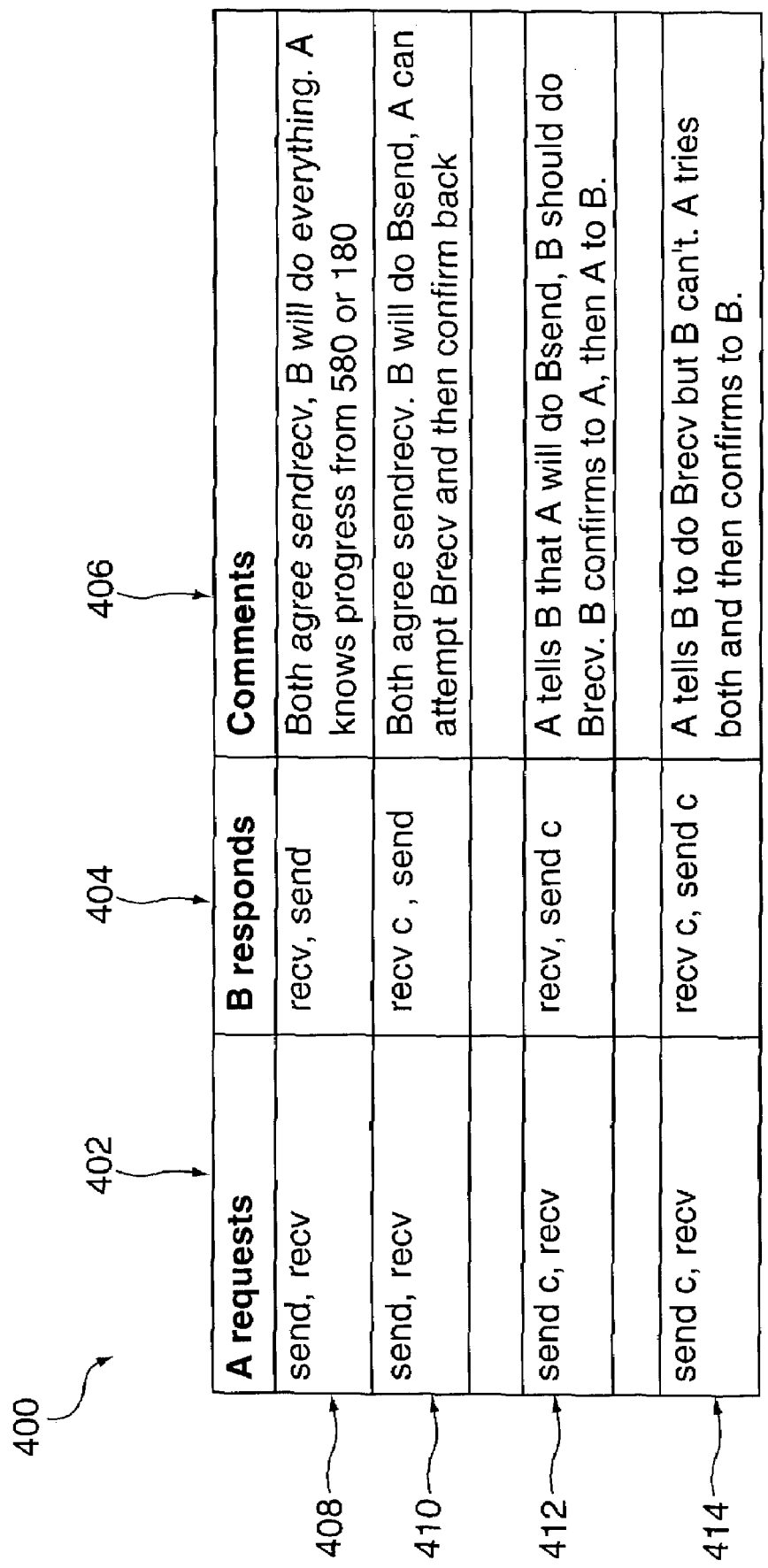
FIGS. 4-7 and the tables included therein show various exemplary signaling features and signaling sequences which may occur in accordance with the present invention.

Table 400 of FIG. 4 shows examples of Lead Role Negotiation in accordance with the invention between an SPP A and an SPP B at either end of a single end to end virtual link First column 402 shows A tags associated with SDP precondition signals sent by endpoint A. Second column 404 shows tags associated with SDP signals sent by endpoint B in response to the signals from endpoint A. Third column 406 shows explanatory comments. Response in the second column 404 is with respect to SDP signals from B to A (Asend/Arecv=send/recv directions in A SDP, Bsend/Brecv=send/recv in B SDP, Asend and Brecv refer to same resources for a packet flow from A to B, whilst Arecv and Bsend refer to the same resources for a packet flow from B to A.

Second row 408 and third row 410 show examples in accordance with the invention where A leaves decisions to B by avoiding confirm in its requests. If A can't do the lead role for Brecv, assigned by B by including the confirm tag, then A can be more specific by using a CANCEL to terminate the call request.

Fifth row 412 shows an example in accordance with the invention where A adds its preferences by including confirm for Asend in request and B agrees such that A undertakes the lead role for Asend.

Seventh row 414 shows an example in accordance with the invention where A adds its preference (B does Asend) but B corrects them (A does Asend as indicated by the confirm from B for Brecv). If A can't do the lead role assumed by B then it can retry or cancel the call.

Figure 5:
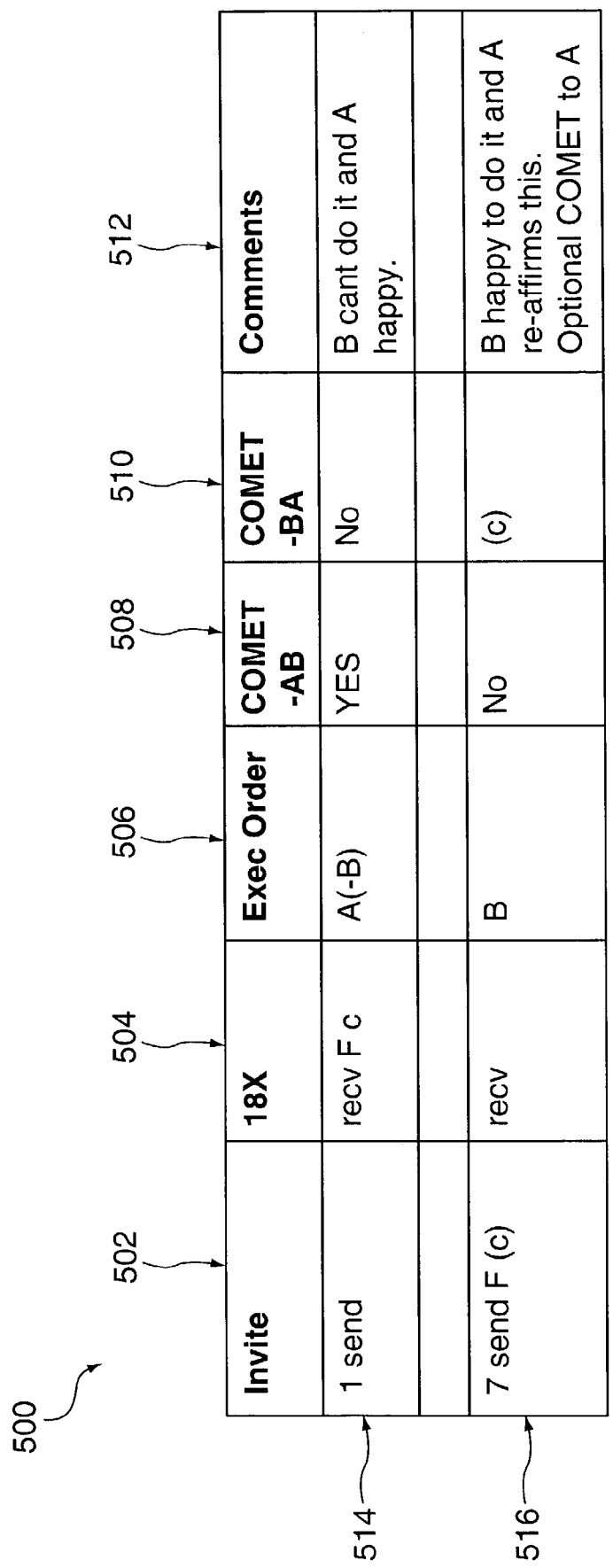

Table 500 of FIG. 5 shows examples of Lead Role Negotiation in accordance with the invention where now the feature of added new states created by use of the failure result-tag (with optional confirm request as F sometimes mandates c) is shown.

First column 502 shows tags associated with Invite messages. Second column 504 shows tags associated with response 18×messages. Third column 506 shows Execution order. Fourth column 508 shows whether a COMET-AB (from network element A to network element B) is mandatory, not required, or optional. Fifth column 510 shows whether a COMET-BA is mandatory, not required, or optional. Sixth column 512 shows explanatory comments. Second row 514 shows an example in accordance with the invention where A is happy to take the lead, where the failure from B indicates it is not capable and so agrees that A should take the lead role and confirm to B. Fourth row 516 shows an example in accordance with the invention where A wants B to take lead role because A is incapable as indicated by the failure, but wants to be informed of the result of attempt by B at the lead role for Brecv precondition.

Figure 6:
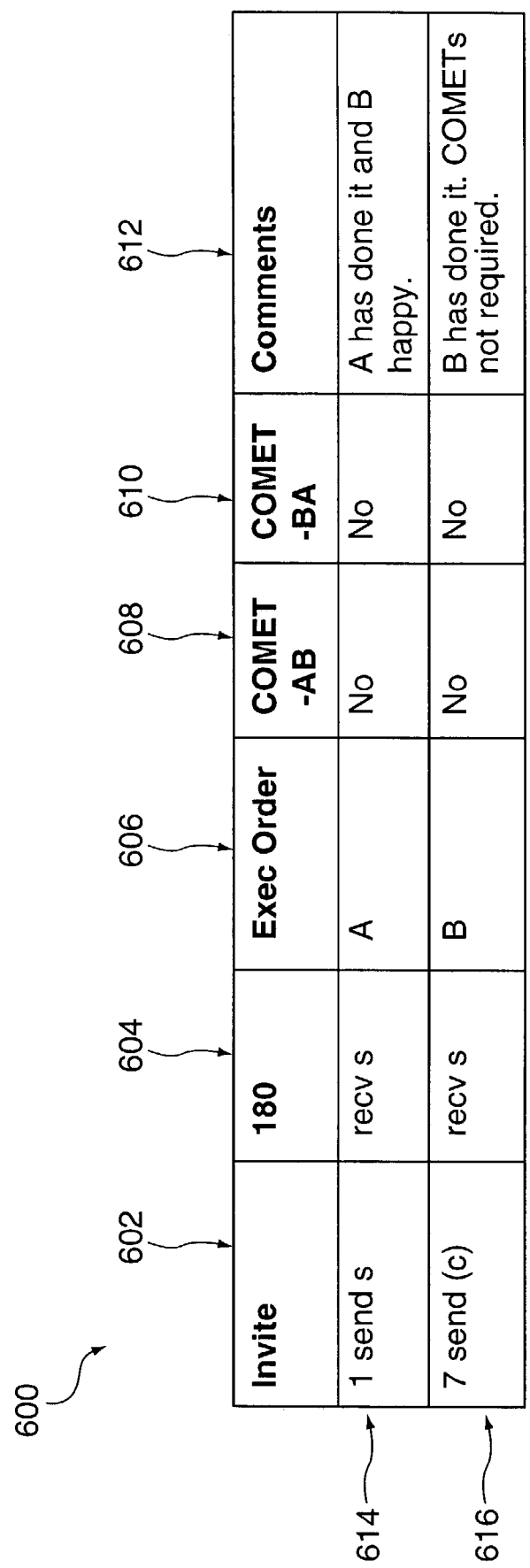

Table 600 of FIG. 6 shows examples of Lead Role Negotiation in accordance with the invention where now the feature of added new states created by success result-tag (with optional confirm request) is shown.

First column 602 shows tags associated with Invite messages. Second column 604 shows tags associated with response 180 messages. Third column 606 shows Execution order. Fourth column 608 shows whether a COMET-AB is mandatory, not required, or optional. Fifth column 610 shows whether a COMET-BA is mandatory, not required, or optional. Sixth column 612 shows explanatory comments.

Second row 614 shows an example in accordance with the invention where A is happy to take lead role and immediately succeeds, informs B of that fact, the result of which is echoed back to A in the 180. Third row 616 shows an example in accordance with the invention where A wants B to take lead role and B immediately succeeds which is communicated in the 180 message that hence satisfies the optional request from A for a confirmation without requiring an additional Comet message.

Figure 7:
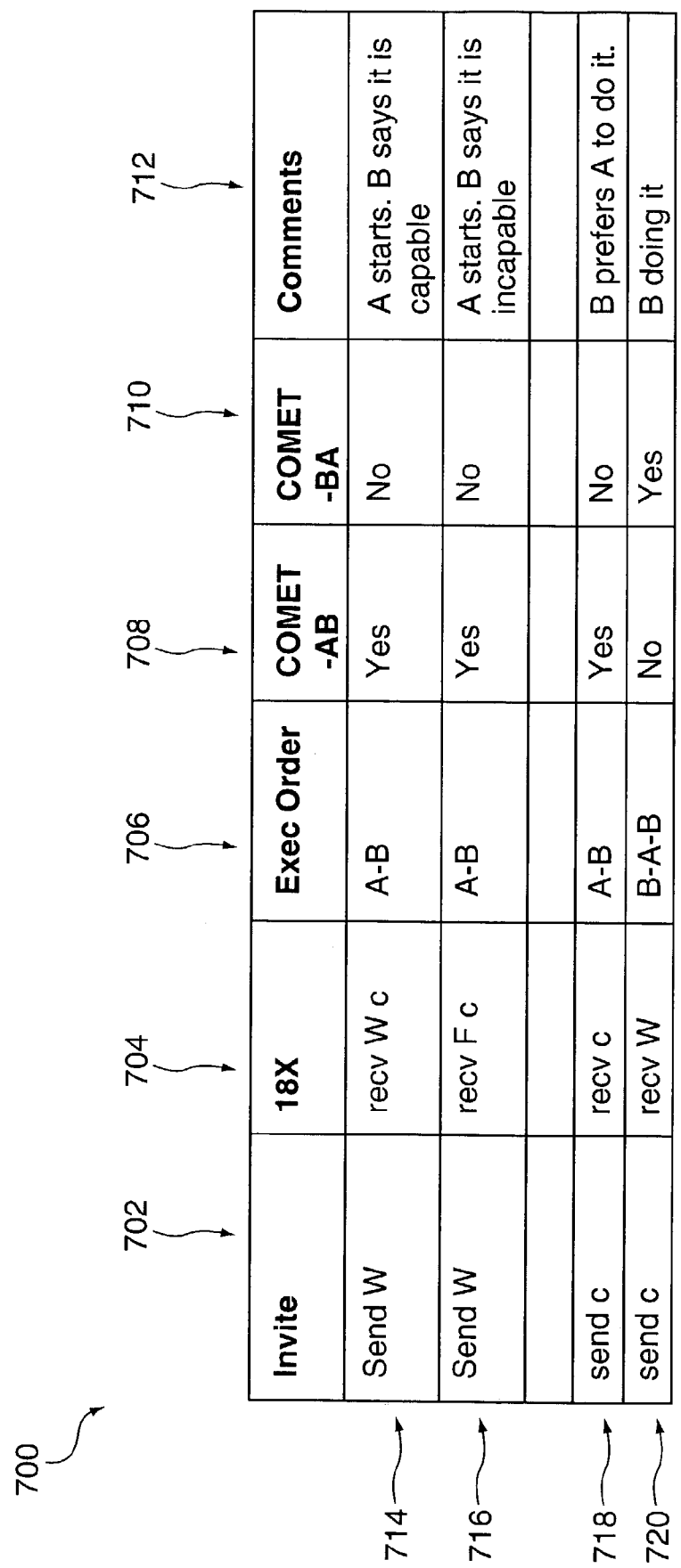

Table 700 of FIG. 7 shows examples of Lead Role Negotiation in accordance with the invention where now the feature of added new states created by Wait result-tag (with optional confirm request) is shown.

First column 702 shows tags associated with Invite messages. Second column 704 shows tags associated with response 18×messages. Third column 706 shows Execution order. Fourth column 708 shows whether a COMET-AB is mandatory, not required, or optional. Fifth column 710 shows whether a COMET-BA is mandatory, not required, or optional. Sixth column 712 shows explanatory comments.

Second row 714 and third row 716 show examples in accordance with the invention where A is happy to take lead role.

Fifth row 718 and sixth row 720 shows examples in accordance with the invention where A wants B to take lead role.

In the cases where the confirm status of both send and recv direction-tags is the same then it may still be useful to use the sendrecv confirm direction-tag and confirmation-tag.

Note that the lead role indicator feature of the invention may still result in the use of the same amount of COMET signaling with the change from combined sendrecv direction-tags, because each end still needs to know what happened at the other end. Specifically, this is useful in signaling precondition failures when a COMET sender was given a lead role. A benefit though is that both ends may start meeting preconditions much quicker than when using the known Draft signaling. This is because both ends have agreed on lead roles and can therefore proceed in parallel. This avoids precondition duplication when their roles aren't clear yet they try to proceed in parallel instead of waiting for the COMET from the other end. Alternatively, this avoids the additional call set-up delay if they instead proceed in series by waiting for the COMET from the other end. It also ensures that lead roles can be flexibly assigned and executed. The use of the result tag can in addition be used to indicate capabilities and early results which themselves reduce the need for separate Comet messages.

Figure 8:
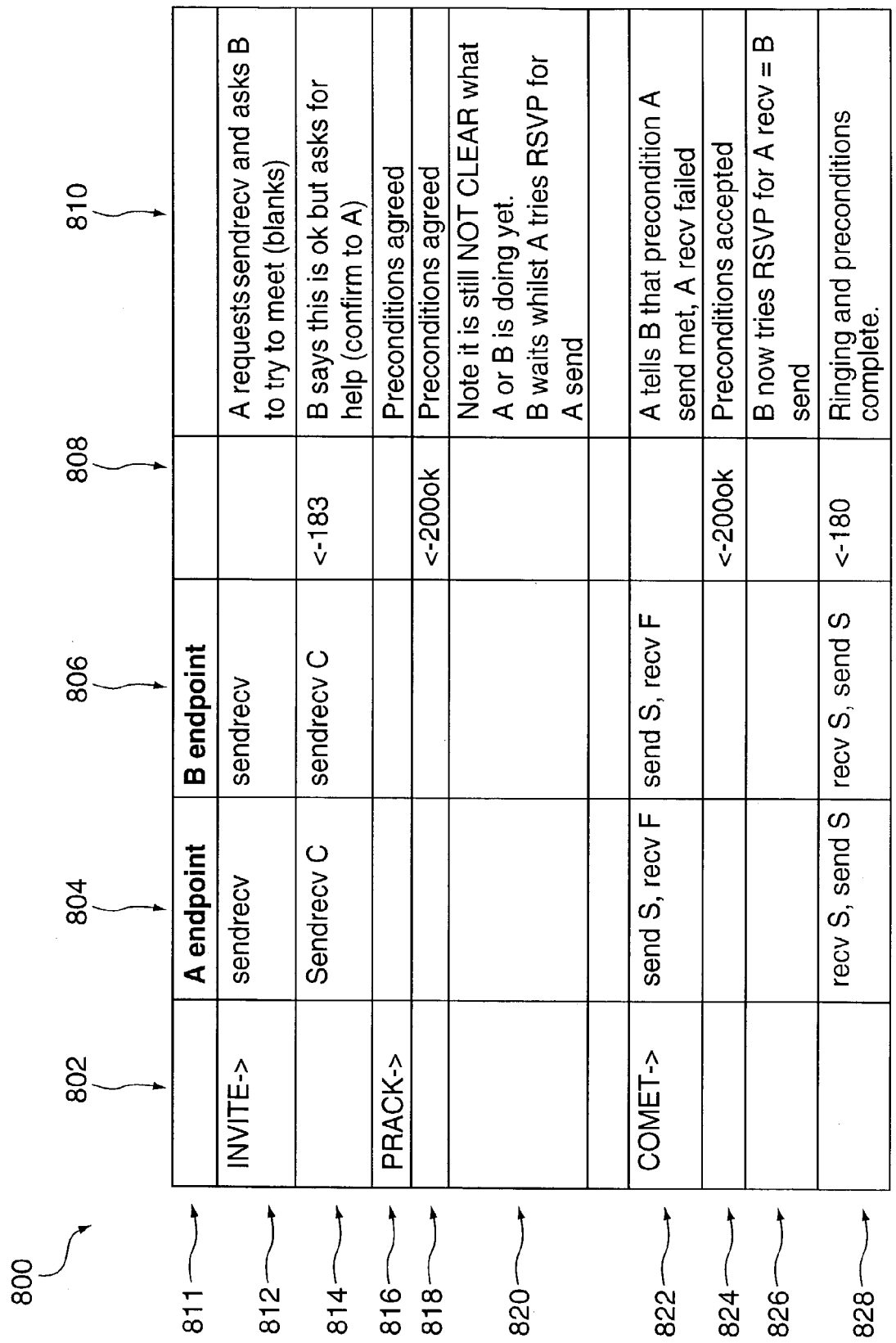
FIGS. 8-9 and the tables included therein illustrates how signaling associated with a call setup technique of the present invention can be implemented using the signaling methods of the present invention.
Figure 9:
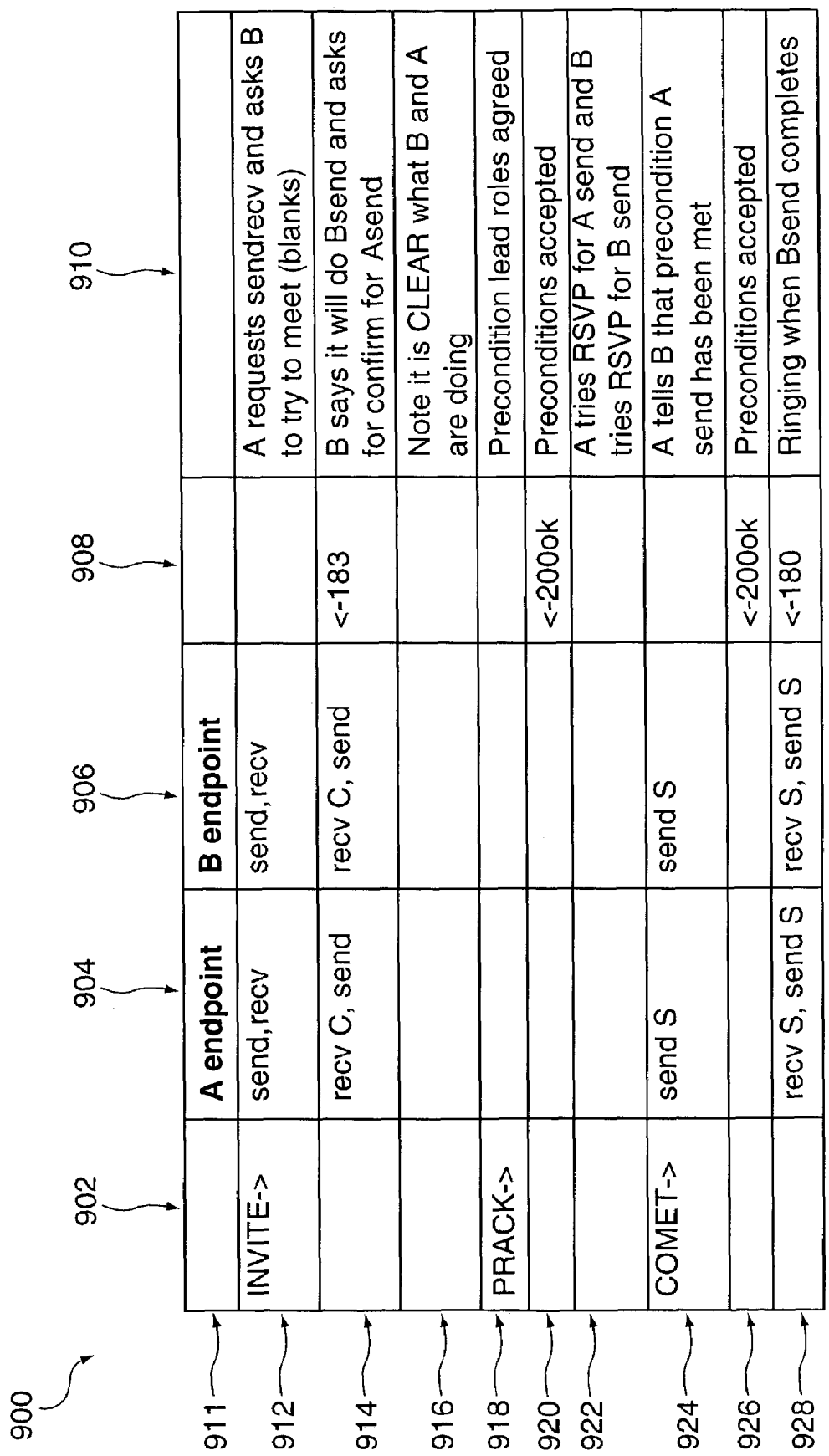

Signaling examples, in accordance with the invention, are shown in Tables 800 and 900 of FIGS. 8-9 with and without the use of lead role negotiation.

The following general notes apply for Tables 800, 900 of FIGS. 8-9:
(1) Both endpoints A and B, corresponding to different network elements, can reserve for their send direction-tags only but a bi-directional session is to be arranged.
(2) C=confirm, S=success, W=wait, F=failure, blank=missing Table 800 of FIG. 8 shows an example of Single Media Call signaling in accordance with the existing draft without Lead Role Negotiation and split direction-tags.

First column 802, and fourth column 808 identify the type of SIP signaling to which the tags in second column 804 and third column 806 relate. Second Column 804 and third column 806 list SDP tags corresponding to signals between the first and second endpoints (A,B) listed in first row 811. Fifth column 810 shows explanatory comments.

Second, third, fourth, fifth, sixth, eighth, ninth, tenth, eleventh rows 812, 814, 816, 818, 820, 822, 824, 826, 828 show a sequence of signaling in an example without Lead Role Negotiation and split direction-tags in accordance with the invention. In this example of Table 800 of FIG. 8, it is implied that A will do what it can while B waits for confirm, else both A and B could attempt the same thing.

Table 900 of FIG. 9 shows an example of Single Media Call signaling in accordance with the invention using Lead Role Negotiation indicators and split direction-tags.

First column 902, and fourth column 908 identify the type of signaling to which the tags in second column 904 and third column 906 relate. Second column 904 and third column 906 list SDP tags corresponding to signals between first and second endpoints (A,B) listed in first row 911. Fifth column 910 shows explanatory comments.

Second, third, fourth, fifth, sixth, seventh, eighth, ninth, and tenth, rows 912, 914, 916, 918,920, 922, 924, 926, 928 show a sequence of signaling in an example with Lead Role Negotiation which uses lead role indicators and split direction-tags in accordance with the invention.

In accordance with the invention, processing will occur independently for each end to end preconditioned SDP direction (send/recv). By agreeing the roles then an end to end resource reservation protocol such as RSVP at B can be started at the same time as the RSVP at A, and specifically before the COMET from A. When the roles are not clear (as in the prior art Draft) then RSVP at B must wait for the COMET. This is whilst fully meeting the DOCSIS specs by not starting reservation until after the three-way SDP negotiation has completed on receipt of the PRACK.

In accordance with the known Draft, the strength tag can initially be mandatory or optional (setting success/failure aside for the moment). The intent of the strength-tag is to indicate whether the precondition is mandatory or optional in the direction indicated by the direction-tag. The strength-tag can also be success or failure. The intent of the strength-tag is then to indicate the progress of the precondition in the direction indicated.

The overloading of the strength-tag leads to loss of mandatory/optional information in the SDP body when the success/failure response is generated. In the general case, this could occur if the responder can meet the precondition in the request immediately and would like to include it in the 183 response body and avoid the need for a subsequent COMET message. However, by doing so the requestor is now missing the responders view on the mandatory/optional fields. This is critical because for both ends to agree to a common set of preconditions for the session then they need to be able to negotiate down to a common subset of preconditions. This is not possible if part of the information is lost. In the case of host based end to end reservations (as in DOCSIS) this is not an issue because the success/failure is not known until after the 183 has gone (precondition negotiation completed) due to the DOCSIS reservation mechanisms which are based on end to end RSVP which itself takes time to complete. Maintaining the strength-tag is also important to detect and respond to transient loss of early booked resources and for mobility (hand-off support). For example, if A tries to meet a precondition early and fails, then in telling the other end it failed it overwrites the strength-tag and so the other end doesn't know whether it has to try to meet the precondition itself for the session to proceed. Finally, the separation is important if the later mechanism of the present invention which involves the use of concatenated preconditions is to be supported when using multiple SPPs.

In accordance with one feature of the invention, a solution based on preconfigured security or QoS, the hosts know immediately whether they can meet a precondition and so could insert success or failure into the INVITE request or 18×response. In doing so however, they remove the mandatory/optional information that the other end needs to understand the agreed preconditions.

The solution of the present invention is to add a new tag, e.g., a result-tag, that indicates end to end progress against the precondition described by the direction-tag and strength-tag. The result-tag enables the separation of the intentions of the originator (strength tag) from the end to end result of attempts to meet the precondition (the result-tag).

The existing known Draft has only two result tag values—success or failure and they are only carried in the SDP within a COMET message. This is now changed in accordance with the present invention, a result-tag can be included in any SDP body so that results can be communicated early (during SDP negotiation) to speed up call signaling where possible. The possible result-tag values are also extended to include WAIT. In addition, the absence of a result-tag (missing) in an SDP body also has a meaning in accordance with one feature of the invention.

The WAIT value indicates (in the absence of progress-tags) that one of the endpoints has started an end to end QoS process and a result will be known soon. This enables SDP negotiation and preconditions negotiation to continue whilst the precondition option is explored. The aim is to stop another SDP Preconditions Processor (SPP) from starting a competing end to end QoS process in the reverse direction for the same resources and so prevent duplicate resources or security associations being exchanged. The Wait state formalises in a result tag additional information on lead roles that can be accumulated during the initial request/response precondition signaling, through the use of the split direction-tags and the confirmation-tags in accordance with the invention. In addition, it can also be used to carry ongoing result status during SDP negotiation and call set-up signaling beyond this initial request/response preconditions negotiation phase and before COMET signaling.

PRACK Implications

The use of a new result tag in accordance with the invention requires no changes to the PRACK message other than providing the possibility of changes to the included SDP precondition attributes as the PRACK progresses.

COMET Implications

The COMET is sent in response to the local completion of preconditions if the peer has requested to be informed of completion by including the confirmation-tag. The confirmation-tag is still end to end as a result of the modifications to SDP signaling discussed herein.

The COMET that is requested by the requestor A in the INVITE, and sent by the responder B after a 183, can be avoided if the result-tag received by the responder B in the INVITE indicates successful end to end completion of that precondition. This is because the Success result-tag will be returned in the 183 SDP as a direct replacement for the COMET.

The COMET that is requested by the responder B on local completion of preconditions at the requestor A can be avoided because the Success result-tag received by the responder B already indicates success so the responder B has no reason to include the confirmation-tag in the 183 provisional response back to the requestor A.

The result is reduced messaging whilst providing a richer, quicker and more efficient preconditions capability. Example Signaling Flows are shown in Table 1000 of FIG. 10.

Table 1000 of FIG. 10 shows examples of signaling flows in accordance with the invention showing the Impact of Result-Tags.

The following general notes apply for the signaling examples in Table 1000 of FIG. 10:
(1) Example is for A send direction (assume mandatory) with a downstream attempt.
(2) C=confirm, S=success, W=wait, F=failure, blank=missing.

First column 1002, and fourth column 1008 identify the type of signaling to which the tags in second column 1004 and third column 1006 relate. Second Column 1004 and third column 1006, list SDP tags corresponding to signals between first and second endpoints (A,B) listed in first row 1011. Fifth column 1010 shows explanatory comments.

Second, third, and fourth rows 1012,1014,1016 show a sequence of signaling flows in an example in accordance with the invention with the advantage of NO need for 183,PRACK, or COMET messages.

Sixth, seventh, and eighth rows 1018,1020,1022 show a sequence of signaling flows in another example in accordance with the invention with the advantage of NO need for 183, PRACK, or COMET messages. Tenth, Eleventh, twelfth and thirteenth rows 1024,1026,1028,1030 show a sequence of signaling flows in an example in accordance with the invention where the inclusion of the wait tag leads to the need for the comet message.

Fifteenth, sixteenth, seventeen and eighteenth rows 1038, 1040, 1042, 1044, 1046 show a sequence of signaling flows in an example in accordance with the invention that provides, as can be seen by the example, the advantage of late requested low overhead confirmations.

New Progress-Tags and SPP Concept

The known Draft is motivated by the case where the SIP proxy is not on the data path whilst in addition being motivated by the desire to support any QoS mechanism. In the case where the SIP proxy can be guaranteed to be on the data path or where the Proxy needs to interact with the preconditions signaling for policy reasons, the SDP extensions in the known Draft are not amenable to manipulation by network elements such as a SIP proxy, a firewall, a security gateway, an RTP mixer/translator, a QoS policy element (Subnet Bandwidth Manager or Bandwidth Broker) etc. In addition, the Draft does not support preconfigured QoS capabilities (no signaling), nor network initiated reservation processes whilst fully supporting user initiated reservation for example using RSVP.

The SDP precondition extensions can be re-designed to support these other alternatives with minimal side-effects on the original deployment assumptions behind the Draft. In addition, no new SIP messages are required by the modifications and the changes are limited to the SDP precondition attributes and processing, including those previously mentioned.

Session signaling (e.g., SIP) is end to end with basic modifications of the present invention to the signaling described in the Draft allowing SDP Session Preconditions Processing elements (SPPs) 202 to read and modify the SDP attributes in the SDP message body that were added by the SDP originator. This is done based on various rules discussed below. The term SPP is used rather than specifically SIP proxies so that it is clear that these mechanisms could be applied to other signaling protocols, in addition to SIP, that use SDP to carry the session description, and which are therefore amenable to precondition extensions. Note that only SIP guarantees two passes through the same SPPs (Via header processing) but other protocols will be very different (SAP, RTSP, HTTP) and will generally only ensure that the endpoints are the same especially in the case of mobile terminals. Another example here might be the use of a HTTP server on a media server to enable SDP to be submitted to the server to book resources from that server and across the access topology. The uplink could be a telephone line but the downlink could be broadcast cable in what is known as the telco-return configuration. You could also use HTTP to carry an SDP payload and use it to book session resources in an access router with HTTP acting as a bearer for application layer user defined dynamic QoS resource reservation.

Figure 3:
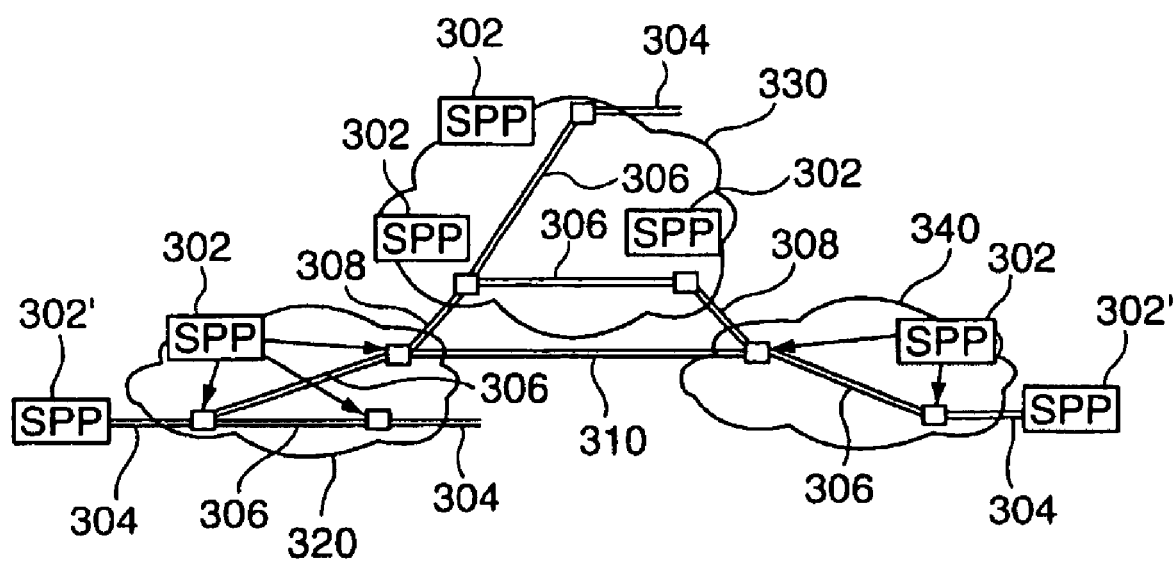
FIG. 3 illustrates the topology of a communications system implemented in accordance with the invention as viewed from a QoS trunks model perspective.

The result-tag implemented in accordance with the invention represents the result of an attempt to meet a precondition end to end. This assumes therefore end to end QoS provisioning and/or signaling. QoS can however be provided end to end through a concatenation of QoS segments that may use wildly different mechanisms as outlined in FIG. 3. FIG. 3 shows end to end QoS provisioning and/or signaling 300 with various QoS Trunk Models. An SPP 302, for example and SPP 302' is located at each end. Multiple Domains Domain #1 320, Domain #2 330, Domain #3 340 are shown. Each domain 320,330,340 may contain one or more SSPs 302. Access trunks 304 connect SPPs 302 external to a domain, for example end SPPs 302', to a SPP 302 within a domain 320, 330, or 340. Intra-domain trunks 306 connect multiple SPPs 302 within a given domain, for example within Domain #1 320, to one another. Inter-Domain trunks 308,310 connect SPPs within different domains to one another. The concatenation of inter-domain trunk 308 between SPP 302 of Domain #1 320 and SPP 302 of Domain #2 330, intra-domain trunk 306 between SPPs 302 within Domain #2 330, and inter-domain trunk 308 between SPP 302 of Domain #2 and SPP 302 of Domain #3 340 may be called a flat trunk. While the direct inter-domain trunk 310 between SPP 302 of Domain #1 320 and SPP 302 of Domain #3 340, bypassing Domain#2 330, may be a hierarchical trunk. Although trunks 304,306,308,310 are shown in FIG. 3 as physical trunks or links between SPPs 302 and/or 302', logical or virtual trunks may be used in place of the physical trunks. Each segment, or virtual QoS trunk, should have an SPP 302 to undertake the checking and satisfaction of preconditions within that segment using whatever techniques it has at its disposal (provisioned resources, reservation signaling, load information, admitted sessions). The techniques may be static or dynamic and may include, for example, Diff-serv, RSVP, MPLS, ATM, etc. End to end preconditions are satisfied when all SPPs 302 end to end have satisfied that precondition on their virtual QoS trunks.

SPP Processing

Preconditions processing normally comprises a single pass from the requester, e.g., one of the SPPSs 302' through intermediate SPPs 302, to the responder, e.g., the other one of the SPPs 302'. There is then a return path back to the requester through either the same (SIP) or different SPPs (SAP, RTSP, etc.) and may involve a reduced set of preconditions. Any of these processors may be able to immediately or subsequently act to satisfy, or refuse, the preconditions in either media direction and in either request or response phases. This can be achieved through reservation protocols, security protocols, Qos/security configuration, load information, session admission state, policy information and/or topology information. Note that whilst it is possible to start trying to meet concatenated preconditions in the INVITE this may be inadvisable if the meeting process is expensive because the callee has not yet accepted the request for a call and so any allocated resources may be unnecessary and only lead to increased session admission blocking.

As the direction-tag, strength-tag and progress-tag progress end to end through the SPPs 302', 302 (whether in the request or response), so the progress-tag is updated using authoritative information in each SPP 302', 302 for the stated preconditions direction for the virtual trunk(s) of that SPP over which the associated media flow will travel. The strength-tag (and other tags) may also be modified on their travels according to network policy as well as precondition progress. In specific circumstances the result-tag affects the processing of the progress-tag, and the progress-tag affects the processing of the result-tag.

Requestor to Responder and Responder to Requestor are separate passes of the precondition processing. Requestor and Responder map last progress-tag in a pass into the result-tag for the next (return) pass.

Result-tag says what happened in the previous pass (INVITE A->B) Progress-tag says what happens in this pass (e.g., 18×response A<-B)

Successful meeting of preconditions requires authoritative SPPs 302', 302 on the signaling path to determine that the precondition can be met whilst failure requires one authoritative SPP 302', 302 to be unable to meet the precondition. Downstream is from an arbitrary SPP 302', 302 towards the responder and upstream is from any arbitrary SDP processor 302', 302 towards the requester. This concatenated progress is tracked in accordance with the invention using a new additional tag type, known as a progress-tag, with associated values, within the SDP body. Each media direction has a strength-tag, a progress-tag and a result-tag in various implementations. In addition, it may have a confirmation-tag.

Progress-Tag Processing

The initial progress tag is set by the Requesting host 302' following a check on the host's virtual segment. The progress-tag is then forwarded to the next SPP 302 for checking in the next virtual QoS trunk, and so on.

The progress-tag may assume the values Yes, No, and Maybe or can be missing.

In general, through an arbitrary number of virtual circuits and SPPs 302', 302,
    any No or missing gives a final No.
    any Maybe gives a final Maybe unless one NO occurs.
    all Yes gives a final Yes.

The changes in a progress-tag at an SPP 302', 302 depend on both the incoming progress-tag and the check in the local segment or virtual trunk of that SPP as shown below.

| Incoming Progress-tag | Local Check | Outgoing Progress-tag |
| --- | --- | --- |
| Yes | Yes | Yes |
| Yes/Maybe | No | No |
| Yes/Maybe | Maybe | Maybe |
| Maybe | Yes/Maybe | Maybe |
| No | Yes/No/Maybe | No |
| Missing | Yes/No/Maybe | No |

Note that once the progress-tag is set to No then checks can be avoided in subsequent SPPs 302 because the result-tag is definitely No. The result-tag is not updated based on information in the progress tag by intermediate SPPs 302. This updating is left to the endpoints 302'. In addition, note that a Maybe should continue to be checked so that a No in a subsequent downstream SPP 302 can still be detected.

The final progress-tag includes a check at the SDP receiving host 302'. The final progress-tag at the receiver of the SDP, following a single pass of concatenated preconditions (A->B or A<-B), is used to update the result-tag.

Listed below are possible final progress tag and result-tag combinations and the action that should be taken in response to such a combination.

| Final Progress-tag | Result-tag | Other action |
|---|---|---|
| Y = Yes | S = Success | Recheck in the reverse direction for SIP only (same SPPs due to Via hdrs) |
| N = No | F = Failure | Can try again in the reverse direction (ok if different SPPs) |
| M = Maybe | W = Wait | M = Maybe continues for SIP only (until preconditions result found) |
| missing | missing | To cope with legacy SPPs that do not support preconditions |

The result-tag carries the concatenated end to end result from the previous pass through the next pass and back to the originator 302' of the original SDP. This provides the originator 302' with an early confirmation without the need for a COMET.

If the second pass goes through the same elements 302 as the first pass (SIP Via header processing) then the progress-tag can identify any changes in the state of the preconditions from the first pass and so provide the originator 302' with timely information. Alternatively, if only some SPPs 302 are common (at least the two endpoints 302' should be) then the progress-tag is not checked and updated with a Success or a Wait result-tag, to avoid corrupting state and/or creating duplicate precondition attempts. The progress-tag with a Failure result-tag can still be rechecked though on the next pass and the result-tag updated with the new progress-tag state.

Concatenated End to End Models

The following lists show the order of processing by end nodes A and B in the case of applying the processing model known from the Draft and the innovative processing model of the invention.

Present Model (Known Draft) Assuming A then B Order
A decides what it wants
A tells B what it wants and if it needs help
B tells A what it will accept and if it needs help
A tries to meet its preconditions
A tells B how it got on
B tries to meet remaining preconditions
Session progresses New Concatenated Model of the Invention
A decides what it wants and can start meeting them
A tells downstream nodes what it wants and they can start meeting them
B tells upstream nodes what it will accept, and what has been achieved
A and downstream nodes try to meet preconditions
Progress is concatenated through downstream nodes to B
B and upstream nodes try to meet the preconditions (A knows progress)
A and downstream nodes try to meet remaining preconditions (B knows)
Session progresses Note that in the comparison here, the new model of the invention is able to use the SDP preconditions negotiation phase to check what is possible and potentially pre-book resources for the session giving much faster call set-up in some cases. This was demonstrated in earlier signaling examples associated with the use of split direction-tags, result-tags and Lead role negotiation of the invention.

Impact on Forking Proxies

In the known Draft, the problem of forking SIP proxies is described in relation to preconditions. The problem is that each forked invite will start QoS reservations end to end back to the Requestor leading to multiple resources being booked when only one call will actually result.

In the concatenated model, the forking proxy can become an SPP and hence observe and rationalise the preconditions so that only a single set of resources are booked from/to caller and minimal resources are booked to/from the callee(s) until the callee(s) locations and availability are determined. Call flows will be added for this later but the proxy accomplishes this by forwarding a Wait in all forked responses whilst keeping note of the successes from the multiple responders, and then converting this to a single success back to the caller only when the actual endpoint for the session is identified. If no endpoint has the resources then the proxy SPP will convert the WAIT to a Failure.

In addition, note that by sending forward the preconditions, confirmation-tag and result-tag from the requester, the responders can see whether or not it is worth responding based on available resources which reduces signaling load overall.

Figure 12:
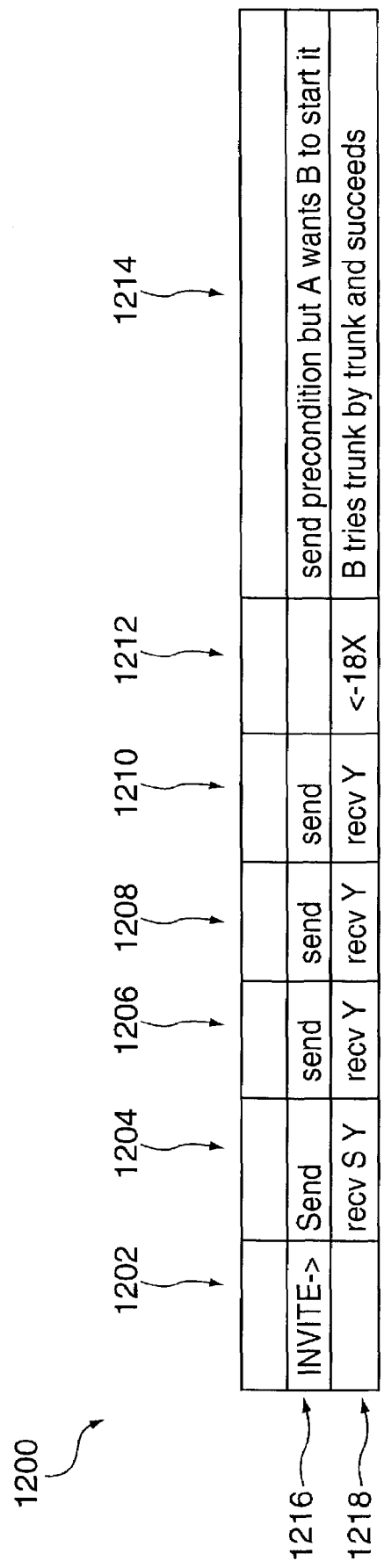

Table 1100 and 1200 shown in FIGS. 11 and 12 include a set of different signaling examples for concatenated preconditions signaling in accordance with the invention.

Table 1100 of FIG. 11 shows concatenated signaling examples for an A send direction (assume mandatory, No confirms to A or B end) with an A send attempt in accordance with the invention.

The following general notes apply to Table 1100 of FIG. 11:
(1) Y=yes, N=no, M=maybe, missing=blank
(2) C=confirm, S=success, W=wait, F=fail, missing=blank First column 1102, and sixth column 1112 identify the type of signaling to which the tags in second column 1104, third column 1106, fourth column 1108, and fifth column 1110 relate. Second Column 1104, third column 1106, fourth column 1108,and fifth column 1110 list SDP tags corresponding to signals between four SPPs on the end to end SIP signaling path, two of which are endpoints 302', the first three columns in each direction show the tags sent from the first three SPPs and the four column showing the received tags at the SPP endpoint 302'. Sixth column 1114 shows explanatory comments.

Second Row 1116 and third row 1118 show a sequence of concatenated signaling flows in accordance with the invention. Fifth row 1120 and sixth row 1122 show another example of a sequence of concatenated signaling flow in accordance with the invention. Additional examples are provided in the set of eighth row 1124, ninth row 1126, and tenth row 1128, the set of twelfth row 1130, thirteenth row 1132, and fourteenth row 1134, and the set of sixteenth row 1136 and seventeenth row 1138.

Table 1200 of FIG. 12 shows a concatenated signaling example for an A send direction (assume mandatory, No confirms to A or B end) with an upstream attempt in accordance with the invention.

The following general notes apply to Table 1200 of FIG. 12:
(1) Y=yes, N=no, M=maybe, missing=blank
(2) C=confirm, S=success, W=wait, F=fail, missing=blank First column 1202, and sixth column 1212 identify the type of signaling to which the tags in second column 1204, third column 1206, fourth column 1208, and fifth column 1210 relate. Second Column 1204, third column 1206, fourth column 1208,and fifth column 1210 list SDP tags corresponding to signals between four SPPs on the end to end SIP signaling path, two of which are endpoints 302', the first three columns in each direction show the tags sent from the first three SPPs and the four column showing the received tags at the SPP endpoint 302' Seventh column 1214 shows explanatory comments. Second Row 1216 and third row 1218 show a sequence of concatenated signaling flows in accordance with the invention.

Applicability To SIP/SDP Designs on Mobile Networks

In one mobile network embodiment, the mobile nodes and the access router are SPPs (202 or 302) yielding four SPPs. Here we will assume that the access routers control admission into the virtual trunk between themselves and the mobile nodes 302, and between each other. A fifth SPP (not shown) may used for SIP call routing purposes in the core of the network.

As before, the success/failure/Wait capabilities are used to track resources within the virtual trunks as the call is set-up.

However, in the case of mobile nodes which can change access routers during a hand-off, the access routers need to be able to revert the progress-tag from Yes to Maybe, No or missing according to the hand-off and admission control rules. We can also use Maybe to delay refusing the call whilst a hand-off is in progress or when a temporary resource shortage occurs in the cell for other reasons.

We should move from Maybe to Yes or No at the responder and requester access routers on the outgoing 180 (kind of final decision) or leave it as Maybe and risk having to go into the Call On Hold state when the 200ok (answer) detects a No. Note that the mandatory/optional strength-tag enables the Caller to decide whether it is happy to go with a Maybe in the 180. Call on hold state is when the call is set-up but no resources are available and the endpoints are so informed. When the resources become available then the session can start.

Figure 13:
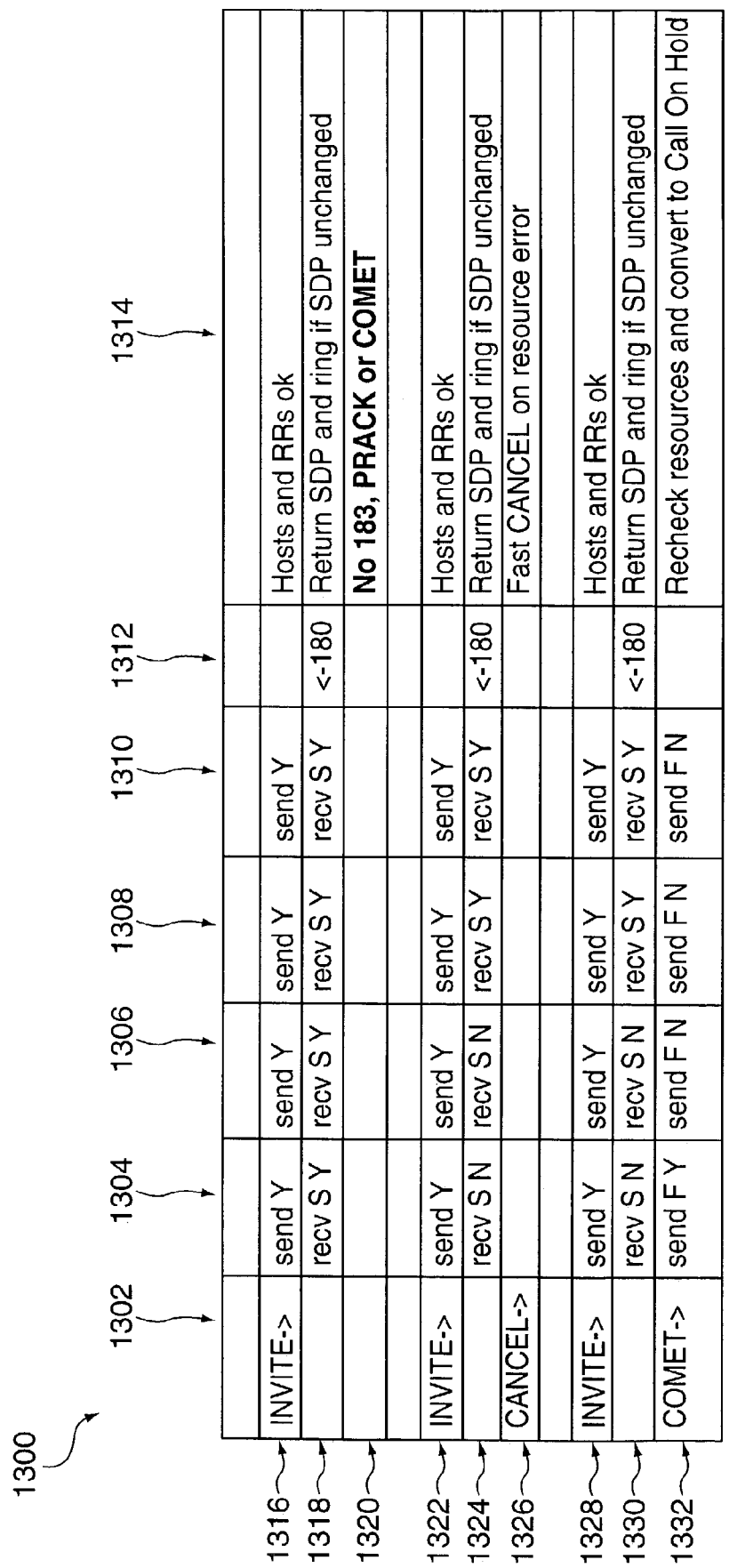

Signaling examples involving four SPPs, including two edge access routers and two endpoints, are shown in table 1300 of FIG. 13.

Table 1300 of FIG. 13 shows signaling examples with concatenated SPPs, result-tags, and progress tags in accordance with the invention.

The following general notes apply to Table 1300 of FIG. 13:
(1) Y=yes, N=no, M=maybe, missing=blank
(2) C=confirm, S=success, W=wait, F=fail, missing=blank First column 1302, and sixth column 1312 identify the type of signaling to which the tags in second column 1304, third column 1306, fourth column 1308, and fifth column 1310 relate. Second Column 1304, third column 1306, fourth column 1308, and fifth column 1310 list SDP tags corresponding to signals between four SPPs on the end to end SIP signaling path, two of which are endpoints 302', the first three columns in each direction show the tags sent from the first three SPPs and the four column showing the received tags at the SPP endpoint 302'. Seventh column 1314 shows explanatory comments.

Second row 1316, third row 1318 and fourth row 1320 show an exemplary sequence of signaling flows in accordance with the invention with the advantage of no 183, PRACK or COMET required.

Sixth row 1322, seventh row 1324 and eight row 1326 show another exemplary sequence of signaling flows in accordance with the invention for a Hand-off at the requesting router (RQRR) after the INVITE was sent and there are no resources in the new cell.

Tenth row 1328, eleventh row 1330, and twelfth row 1332 show another exemplary sequence of signaling flows in accordance with the invention for a hand-off at the RQRR after the INVITE was sent and there are no resources in the new cell. It would have been useful here if we could have the recheck of resources in the RQRR also cause the media to be cancelled for a call on hold by setting the port for the affected media line to zero.

Summary of New SDP Preconditions

The preconditions attributes represent changes from section 5.1 of the Draft. The formatting of the QoS and the security attribute in the Session Description Protocol (SDP) is then described by the following Backus-Naur Form (BNF)

```
QoS-attribute = "a=QoS:" strength-tag SP direction-tag [SP result-tag]
    [SP progress-tag] [SP confirmation-tag]
sec-attribute = "a=secure:" SP strength-tag SP direction-tag [SP result-tag]
    [SP progress-tag] [SP confirmation-tag]
strength-tag = ("mandatory" | "optional")     can be missing
direction-tag = ("send" | "recv" | "sendrecv")
result-tag    = ("success" | "failure" | "Wait") can be missing
progress-tag = ("Yes" | "No" | "Maybe")          can be missing
confirmation-tag = "confirm"                             can be missing
```

Note that the result-tag is optional in most SIP messages but should be included in the COMET message as this message is intended to convey results.

Coexistence of Concatenated and End to End Preconditions

Inventive Features:

End to End Virtual trunk uses result-tag and only one SPP can undertake precondition checks at one time into that virtual trunk for a specific direction-tag or SDP body originator. In the existing known Draft, only endpoints 302' were capable of attempting end to end preconditions. This feature of the invention enables and SPP to be end to end capable and for end to end and concatenated preconditions processing to coexist in attempting to meet a single end to end precondition.

End to end capable SPPs check and update the result-tag as the SDP body passes through them. They only do so if the result-tag is Failure or missing, and the progress-tag is No or missing. This is because this indicates that no previous SPP is still attempting or has succeeded in meeting fully or partially meeting the end to end precondition, either through an end to end mechanism or through concatenation. The last node in a concatenated attempt effectively converts the incoming progress-tag and its own check into an end to end check and is why it updates the result-tag as well.

| Outgoing Result-tag | Condition |
|---|---|
| Success | End to end precondition is successful |
| Failure | If incoming result-tag was Failure or missing, then Failure set if end to end also failed. |
| Wait | If incoming result-tag was Failure or missing, Wait set if end to end attempt in progress. |
| Missing | If incoming result-tag was missing, then tag still missing if end to end attempt was not made. |

The above described methods and apparatus are exemplary. Numerous variations are possible while keeping within the scope of the invention.

What is claimed:

1. A method comprising operating a first network element to perform the steps of:
generating a first session description message including at least two separate direction tags for a media line, the two separate direction tags including a send tag and a receive tag, said at least two separate direction tags for said media line allowing separate session description information for each of said send and receive directions to be communicated; and
sending the first session description message to a second network element as part of a session establishment process.

2. The method of claim 1, wherein generating a first session description message includes:
including in said first session description message a plurality of tags, at least one tag being associated with said send tag and at least one other tag being associated with said receive tag, at least one tag associated with said send tag being different from any tags associated with said receive tag.

3. The method of claim 1, wherein generating a first session description message includes:
including in said first session description message a status indicator associated with at least one of said two separate direction tags, the status indicator being from a group of status indicators including a success indicator and a failure indicator, the success indicator indicating success in meeting a session precondition, the failure indicator indicating a failure in meeting a session precondition, said success and failure indicators being used to inform the second network element of the success or failure in satisfying the session precondition with which said indicator is associated.

4. The method of claim 1, wherein including in said first session description message a status indicator associated with at least one of said two separate direction tags includes:
including in said first session description message a first status indicator associated with said send tag and a second status indictor associated with said receive tag, the first and second status indicators being different, each of said first and second status indicators being from a group of status indicators including a success indicator and a failure indicator, the success indicator indicating success in meeting a session precondition, the failure indicator indicating a failure in meeting a session precondition, said success and failure indicators being used to inform the second network element of the success or failure in satisfying the session precondition with which said indicators are associated.

5. The method of claim 3, wherein said status indicator is a result tag.

6. The method of claim 3, further comprises:
including in said first session description message a lead role indicator associated with at least one of said two separate direction tags, the lead role indicator indicating which one of said first and second network elements should take the lead role in attempting to satisfy a session precondition corresponding to the direction tag associated with said lead role indicator.

7. The method of claim 6, wherein generating the first session description message further includes:
including in said first session description message one of a mandatory indicator indicating a mandatory session precondition in the direction indicated by the at least one of said direction tags, and an optional indicator indicating an optional session precondition in the direction indicated by the at least one of said direction tags, said included one of a mandatory indicator and an optional indicator being associated with at least one of said two separate direction tags.

8. The method of claim 7, wherein a mandatory indicator is associated with one of said send and receive tags and an optional indicator is associated with the other one of said send and receive tags.

9. The method of claim 1, further comprising:
including in said first session description message one of a mandatory indicator indicating a mandatory session precondition in the direction indicated by the at least one of said direction tags and an optional indicator indicating an optional session precondition in the direction indicated by the at least one of said direction tags, said included one of a mandatory indicator and an optional indicator being associated with at least one of said two separate direction tags.

10. The method of claim 9, further comprising:
including in said first session description message one of a success and a failure indicator associated with the same one of said send and receive tags as said one of a mandatory indicator and an optional indicator.

11. The method of claim 1, further comprising:
including in said first session description message one lead role indicator being associated with said send tag and another lead role indicator being associated with said receive tag, each of said lead role indicators indicating which one of said first and second network elements should take a lead role in satisfying a session precondition corresponding to the direction tag associated with each of said lead role indicators.

12. The method of claim 1, further comprising:
including a lead role indicator in said first message associated with a first one of said send and receive tags, said lead role indicator indicating which one of said first and second network elements should take a lead role in satisfying a session precondition corresponding to the direction identified by said first one of said send and receive tags.

13. The method of claim 12, further comprising including in said first message an indicator associated with at least one of said send and receive tags indicating whether a precondition is an optional precondition or a mandatory precondition, wherein including a precondition indicator indicating a mandatory precondition indicates that a communications session corresponding to said first message should not be established at the second network element receiving said first message until said precondition has been satisfied.

14. The method of claim 7, wherein generating said first session description message further includes:
including in said first message a status indicator associated with at least one of said send and receive tags, with which said included one of an optional indicator and a mandatory indicator is associated.

15. The method of claim 14, wherein said status indicator includes an indicator from a group of indicators including at least a success indicator and a failure indicator, said success indicator indicating success in meeting a session precondition, the failure indicator indicating a failure in meeting a session precondition, said success and failure indicators being used to inform the second network element of the success or failure in satisfying the session precondition with which said indicators are associated.

16. The method of claim 14, wherein said status indicator is a wait indicator indicating to said second network element that the second network element should wait for the first network element to attempt to meet a session precondition in the direction indicated by said at least one of said associated send and receive tags with which said status indicator is associated.

17. The method of claim 1, wherein generating said first session description message further includes:
including in said first message a status indicator associated with at least one of said send and receive tags, said status indicator including an indicator from a group of indicators, said group of indicators including at least a success indicator and a failure indicator, said success indicator indicating success in meeting a session precondition, the failure indicator indicating a failure in meeting a session precondition, said indicator being used to inform the second network element of the success or failure in satisfying the session precondition with which said indicators are associated.

18. The method of claim 1, further comprising:
following sending said first session description message, sending two different confirmation messages to the second network element, each one of said two different confirmation messages reporting the result of the preconditions attempt by the first network element for a different one of the send and receive direction tags.

19. A machine readable data storage device, comprising:
a session description message stored on the machine readable data storage device, the stored session description message including:
a media line; and
at least two separate direction tags for said media line, said at least two separate direction tags for said media line communicating separate session description information for each of said send and receive directions.

20. The machine readable data storage device of claim 19, wherein said session description message further includes:
a status indicator tag associated with at least one of said separate direction tags.

21. The machine readable data storage device of claim 20, wherein said session description message further includes:
one of a mandatory indicator and an optional indicator associated with said at least one of said separate direction tags.

22. The machine readable data storage device of claim 20, wherein said status indicator is from a group of status indicators including: i) a success indicator and ii) a failure indicator, the success indicator indicating success in meeting a session precondition, the failure indicator indicating a failure in meeting a session precondition.

23. The machine readable data storage device of claim 20, wherein said status indicator indicates that a device receiving the message should wait before trying to satisfy a session precondition associated with said status indicator.

24. The machine readable data storage device of claim 20, wherein said session description message further includes:
a lead role indicator associated with said one of said separate direction tags, said lead role indicator indicating that the device receiving the message should not take a lead role in satisfying a session precondition in the direction identified by said one of said separate direction tags.

25. A method of processing communications session establishment signals, the method comprising:
operating a first network element to process a first session description message including at least two direction tags for a media line, the two direction tags including a send tag and a receive tag, said at least two direction tags for said media line allowing separate session description information for each of said send and receive directions to be communicated; and
the first session description message further including a plurality of additional tags associated with each of said send and receive tags, said processing including:
merging the send and receive tags into a combined sendrecv tag when the additional tags associated with each of the send tag and the receive tag are the same.

26. The method of claim 25, wherein said first network element is a network node positioned between two session description message end points.

27. The method of claim 26, further comprising:
operating the first network element to:
transmit the combined send/receive tag generated by said merging; and
to process a second session description message including a sendrecv direction tag for a media line, the second session description message further including a plurality of additional tags associated with the sendrecv direction tag, said processing including:
splitting the sendrecv tag and its plurality of additional tags into two direction tags for each of the send and receive directions, wherein each direction tag includes a copy of the additional tags associated with the merged sendrecv direction tag.

28. A communications method for use by a second network element, comprising:
receiving a session description message information indicating that a session precondition has or has not been satisfied for a portion of a communications path extending between a first network element and the second network element, said portion being less than the entire communications path extending between the first network element and the second network element; and
operating the second network element to determine from said information and from additional information whether the session precondition has been satisfied for the entire path.

29. The communications method of claim 28, wherein said additional information is information indicating whether said precondition has been satisfied for a link immediately connected to said second node, said link being included in said communications path.

30. The communications method of claim 29, wherein said information is a progress tag indicating progress in meeting a session precondition end to end over at least two virtual links of said communications path.

31. A machine readable data storage device, comprising:
a stored session description message including:
a media line;
a direction tag indicating the direction of a session precondition, said direction tag indicating one of a send and a receive direction, said session description associated with said media line including additional information that is different for said send and receive directions;
one of a success indicator and a failure indicator associated with said direction tag indicating one of success and failure, respectively, at meeting a session precondition; and
one of an optional indicator and a mandatory indicator also being associated with said direction tag indicating whether a session precondition is optional or mandatory to be met before the session commences.

32. The machine readable data storage device of claim 31, wherein said stored session description message is an invite message.

33. A first network element for use in a communications system including said first network element and a second network element, said first network element comprising:
a central processing unit configured to process a session description message which includes:
at least two separate direction tags for a media line, the two separate direction tags including a send tag and a receive tag, said at least two separate direction tags for said media line allowing separate session description information for each of said send and receive directions to be communicated; and
an output interface for transmitting said session description message to the second network element as part of a session establishment process.

34. The first network element of claim 33,
wherein said first network element further includes digital storage media for storing said session description message; and
wherein said central processing unit is configured to include different information with said send tag than is included with said receive tag when different requirements apply to the send and receive directions.

35. The first network element of claim 34, wherein at least one tag associated with said send tag is different from any tags associated with said receive tag.

36. A first network element for use in a communications system including said first network element and a second network element, said first network element comprising:
means for generating a session description message, which includes at least two separate direction tags for a media line, the two separate direction tags including a send tag and a receive tag, said at least two separate direction tags for said media line allowing separate session description information for each of said send and receive directions to be communicated; and
means for sending said generated session description message to the second network element as part of a session establishment process.

37. The first network element of claim 36, further comprising:
means for including in said first session description message a plurality of tags, at least one tag being associated with said send tag and at least one other tag being associated with said receive tag.

38. The first network element of claim 37, wherein at least one tag associated with said send tag is different from any tags associated with said receive tag.

* * * * *

UNITED STATES PATENT AND TRADEMARK OFFICE
CERTIFICATE OF CORRECTION

PATENT NO. : 7,647,408 B2
APPLICATION NO. : 10/356146
DATED : January 12, 2010
INVENTOR(S) : Alan O'Neill It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1023 days.

Signed and Sealed this

Twenty-eighth Day of December, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,647,408 B2 | Page 1 of 1 |
| APPLICATION NO. | : 10/356146 | |
| DATED | : January 12, 2010 | |
| INVENTOR(S) | : O'Neill | |

It is certified that error appears in the above-identified patent and that said Letters Patent is hereby corrected as shown below:

Column 22, line 35, claim 27: "to process" to read as --process--

Signed and Sealed this
Twenty-fourth Day of July, 2012

David J. Kappos
*Director of the United States Patent and Trademark Office*